United States Patent
Yuan et al.

(10) Patent No.: US 12,034,604 B2
(45) Date of Patent: Jul. 9, 2024

(54) MQTT PROTOCOL SIMULATION METHOD AND SIMULATION DEVICE

(71) Applicant: CHINA UNIONPAY CO., LTD., Shanghai (CN)

(72) Inventors: Hang Yuan, Shanghai (CN); Lijun Zu, Shanghai (CN); Guobao Liu, Shanghai (CN); Jun Fu, Shanghai (CN); Zhijie Xue, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/799,864

(22) PCT Filed: Jan. 13, 2021

(86) PCT No.: PCT/CN2021/071535
§ 371 (c)(1),
(2) Date: Aug. 15, 2022

(87) PCT Pub. No.: WO2022/032984
PCT Pub. Date: Feb. 17, 2022

(65) Prior Publication Data
US 2023/0080588 A1 Mar. 16, 2023

(30) Foreign Application Priority Data
Aug. 12, 2020 (CN) .......................... 202010808243.3

(51) Int. Cl.
*H04L 41/14* (2022.01)
*H04L 43/0811* (2022.01)

(52) U.S. Cl.
CPC ........ *H04L 41/145* (2013.01); *H04L 43/0811* (2013.01)

(58) Field of Classification Search
CPC ....... H04L 67/12; H04L 67/10; H04L 67/562; H04L 67/60; H04L 63/08; H04L 41/0806; H04L 65/1069; H04L 65/1073; H04L 41/0823; H04L 67/56; H04L 63/10; H04L 61/45; H04L 63/12; H04L 63/1433;
(Continued)

(56) References Cited

U.S. PATENT DOCUMENTS 9,509,529 B1* 11/2016 McAllister ............ H04L 51/226
10,977,149 B1* 4/2021 Zappella ............... G06F 11/3457
(Continued)

FOREIGN PATENT DOCUMENTS

CN 101043461 A 9/2007
CN 101132321 A 2/2008
(Continued)

*Primary Examiner* — Djenane M Bayard
(74) *Attorney, Agent, or Firm* — Foley & Lardner LLP

(57) ABSTRACT

The simulation device is provided with a user space and a network adapter. The method comprises: a simulation device obtains a serialization command of a simulation test and configures the serialization command for a plurality of MQTT client instances, controls the plurality of MQTT client instances to package the serialization command by using a simulation protocol stack of a user space so as to obtain a simulation message, transmits the simulation message to a network adapter, and the network adapter sends said message to an MQTT server for simulation testing.

20 Claims, 9 Drawing Sheets

(58) Field of Classification Search
CPC . H04L 63/1458; H04L 65/1083; H04L 67/02; H04L 67/561; H04L 67/125; H04L 67/566; H04L 1/0041; H04L 67/1097; H04L 1/0002; H04L 1/0009; H04L 1/18; H04L 5/0064; H04L 67/34; H04L 67/55; H04L 69/40; H04L 67/53; H04L 69/16; H04L 67/565; H04L 67/5651; H04L 67/61; H04L 69/08; H04L 1/0076; H04L 41/12; H04L 63/0428; H04L 63/062; H04L 63/101; H04L 1/16; H04L 1/1854; H04L 1/1867; H04L 1/1874; H04L 2012/4026; H04L 41/22; H04L 2463/062; H04L 41/0816; H04L 63/20; H04L 63/1416; H04L 63/1425; H04L 63/102; H04L 67/51; H04L 43/10; H04L 43/16; H04L 63/1408; H04L 63/1441; H04L 67/563; H04L 12/2801; H04L 63/145; H04L 67/306; H04L 12/2803; H04L 12/2838; H04L 12/2869; H04L 12/2898; H04L 27/0006; H04L 27/0014; G06F 16/24568; G06F 16/248
See application file for complete search history.

(56) References Cited

U.S. PATENT DOCUMENTS

| | | | |
|---|---|---|---|
| 2017/0364612 A1* | 12/2017 | Broodney | G06F 30/20 |
| 2018/0060159 A1* | 3/2018 | Justin | G06F 11/0787 |
| 2018/0129519 A1* | 5/2018 | Bharadwaj | H04L 67/10 |
| 2020/0007428 A1* | 1/2020 | Ekambaram | H04L 61/4511 |

FOREIGN PATENT DOCUMENTS

| | | |
|---|---|---|
| CN | 101150487 A | 3/2008 |
| CN | 101150488 A | 3/2008 |
| CN | 102104894 A | 6/2011 |
| CN | 102984025 A | 3/2013 |
| CN | 103731345 A | 4/2014 |
| CN | 108322356 A | 7/2018 |
| CN | 109921947 A | 6/2019 |
| CN | 111124850 A | 5/2020 |
| CN | 112039722 A | 12/2020 |
| EP | 3 355 491 B1 | 8/2018 |

* cited by examiner

MQTT PROTOCOL SIMULATION METHOD AND SIMULATION DEVICE

CROSS REFERENCE TO RELATED APPLICATIONS

This application is a national phase entry under 35 U.S.C. § 371 of International Application No. PCT/CN2021/071535, filed on Jan. 13, 2021, which claims priority of Chinese Patent Application No. 202010808243.3, filed with the China National Intellectual Property Administration (CNIPA) on Aug. 12, 2020 and entitled "MQTT PROTOCOL SIMULATION METHOD AND SIMULATION DEVICE", the entire contents of which are incorporated herein by reference.

FIELD

The invention relates to the technical field of simulation, in particular to a message queuing telemetry transport (MQTT) protocol simulation method and a simulation device.

BACKGROUND

At present, there are two main ways to test an MQTT server (broker, also known as an agent): one is to use a real MQTT client to connect with the server, and the other is to use an MQTT client supporting the MQTT server to be in simulated connection with the MQTT server for testing.

When the first way is used, a large quantity of Internet of Things (IoT) physical devices are needed to access the network, resulting in complex networking and high cost. While the second way is used, since the simulation client is implemented based on a protocol stack of an operating system, the protocol stack in a kernel space needs to be read during the simulation process, which may cause extra time consumption to a CPU and reduce the data throughput capability of the simulation client.

SUMMARY

The present disclosure provides an MQTT protocol simulation method and a simulation device, which can improve the simulation efficiency and reduce the simulation cost.

In a first aspect, the present disclosure provides an MQTT protocol simulation method. A simulation device is provided with a user space and a network adapter. The method includes:
  obtaining, by the simulation device, a serialization command of a simulation test, and configuring the serialization command for a plurality of MQTT client instances;
  controlling, by the simulation device, the plurality of MQTT client instances to package the serialization command by using a simulation protocol stack of the user space so as to obtain a simulation message; and
  controlling, by the simulation device, the plurality of MQTT client instances to transmit the simulation message to the network adapter, and sending, by the network adapter, the simulation message to an MQTT server for simulation testing.

In the above technical solution, when the simulation device performs simulation testing, since the serialization command can be packaged directly by means of the simulation protocol stack in the user space so as to obtain the simulation message, the serialization command does not need to be packaged by means of a system protocol stack in a kernel space, which can improve the efficiency of simulation testing. Further, the quantity of the MQTT client instances is not limited by the kernel space, and the simulation testing of a large number of MQTT client instances can be achieved.

Optionally, the method further includes:
  controlling, by the simulation device, the network adapter to receive an MQTT message sent by the MQTT server, wherein the MQTT message includes an MQTT client instance ID;
  controlling, by the simulation device, the network adapter to transmit the MQTT message to an MQTT client instance corresponding to the MQTT client instance ID according to the MQTT client instance ID; and
  controlling, by the simulation device, the MQTT client instance corresponding to the MQTT client instance ID to parse the MQTT message by using the simulation protocol stack of the user space so as to obtain test response data.

Optionally, the controlling, by the simulation device, the plurality of MQTT client instances to transmit the simulation message to the network adapter, includes:
  controlling, by the simulation device, the plurality of MQTT client instances to transmit the simulation message to the network adapter by using a direct memory access (DMA) technology.

The controlling, by the simulation device, the network adapter to transmit the MQTT message to the MQTT client instance corresponding to MQTT client instance ID according to the MQTT client instance ID, includes:
  controlling, by the simulation device, the network adapter to transmit the MQTT message to the MQTT client instance corresponding to the MQTT client instance ID by using the DMA technology according to the MQTT client instance ID.

Optionally, the method further includes:
  obtaining, by the simulation device, a simulation traffic model; and
  configuring, by the simulation device, simulation indexes of the simulation test for the plurality of MQTT client instances according to the simulation traffic model.

The simulation indexes include a new connection rate and a disconnection rate initiated by the MQTT client instances per unit time, and a quantity of concurrent connections in a simulation cycle.

Optionally, the serialization command includes but is not limited to the following simulation behaviors:
  a client goes online, the client publishes a topic, the client initiates a subscription, the client stays online, the client cancels the subscription, and the client goes offline.

Optionally, any MQTT client instance in the plurality of MQTT client instances includes a simulation publisher and a simulation subscriber.

When the MQTT client instances are simulation publishers, the serialization command includes the client going online, the client publishing the topic, the client staying online, and the client going offline.

When the MQTT client instances are simulation subscribers, the serialization command includes the client going online, the client initiating the subscription, the client staying online, the client canceling the subscription, and the client going offline.

In a second aspect, embodiments of the present disclosure provide a simulation device. The simulation device is provided with a user space and a network adapter, and includes:

an obtaining unit, configured to obtain a serialization command of a simulation test, and configure the serialization command for a plurality of message queuing telemetry transport (MQTT) client instances; and a processing unit, configured to control the plurality of MQTT client instances to package the serialization command by using a simulation protocol stack of the user space so as to obtain a simulation message; and control the plurality of MQTT client instances to transmit the simulation message to the network adapter, wherein the network adapter sends the simulation message to an MQTT server for simulation testing.

Optionally, the processing unit is further configured to:

control the network adapter to receive an MQTT message sent by the MQTT server, wherein the MQTT message includes an MQTT client instance ID;

control the network adapter to transmit the MQTT message to an MQTT client instance corresponding to the MQTT client instance ID according to the MQTT client instance ID; and control the MQTT client instance corresponding to the MQTT client instance ID to parse the MQTT message by using the simulation protocol stack of the user space so as to obtain test response data.

Optionally, the processing unit is configured to:

control the plurality of MQTT client instances to transmit the simulation message to the network adapter by using a direct memory access (DMA) technology; and control the network adapter to transmit the MQTT message to the MQTT client instance corresponding to MQTT client instance ID by using the DMA technology according to the MQTT client instance ID.

Optionally, the processing unit is further configured to:

control the obtaining unit to obtain a simulation traffic model; and configure simulation indexes of the simulation test for the plurality of MQTT client instances according to the simulation traffic model, wherein the simulation indexes include a new connection rate and a disconnection rate initiated by the MQTT client instances per unit time, and a quantity of concurrent connections in a simulation cycle.

Optionally, the serialization command includes but is not limited to the following simulation behaviors:

a client goes online, the client publishes a topic, the client initiates a subscription, the client stays online, the client cancels the subscription, and the client goes offline.

Optionally, any MQTT client instance in the plurality of MQTT client instances includes a simulation publisher and a simulation subscriber.

When the MQTT client instances are simulation publishers, the serialization command includes the client going online, the client publishing the topic, the client staying online, and the client going offline.

When the MQTT client instances are simulation subscribers, the serialization command includes the client going online, the client initiating the subscription, the client staying online, the client canceling the subscription, and the client going offline.

In a third aspect, embodiments of the present disclosure provide a computing device, including:

a memory, configured to store program instructions; and a processor, configured to call the program instructions stored in the memory, and execute the above MQTT protocol simulation method according to obtained programs.

In a fourth aspect, embodiments of the present disclosure provide a computer-readable non-transitory storage medium, including computer-readable instructions that, when read and executed by a computer, enable the computer to execute the above MQTT protocol simulation method.

In a fifth aspect, embodiments of the present disclosure provides a simulation device, including:

at least one processor; and a memory in communication connection to the at least one processor, wherein the memory stores instructions executable by the at least one processor, and the instructions are executed by the at least one processor to enable the at least one processor to execute the above method described in the first aspect.

BRIEF DESCRIPTION OF THE DRAWINGS

In order to describe the technical solutions of the embodiments of the present disclosure more clearly, a brief description will be given below with reference to the accompanying drawings which are used in the description of the embodiments. Obviously, the drawings in the description below are merely some embodiments of the present disclosure, and it would have been obvious for a person of ordinary skill in the art to obtain other drawings according to these drawings without involving any inventive effort.

DETAILED DESCRIPTION OF THE EMBODIMENTS

In order to make the purpose, technical solutions and advantages of the present disclosure clearer, the present disclosure will be further described in detail below in conjunction with accompanying drawings. Obviously, the described embodiments are merely part of, rather than all of, embodiments of the present disclosure. Based on the described embodiments of the present disclosure, all other embodiments obtained by those ordinarily skilled in the art without creative labor fall within the protection scope of the present disclosure.

Figure 1:
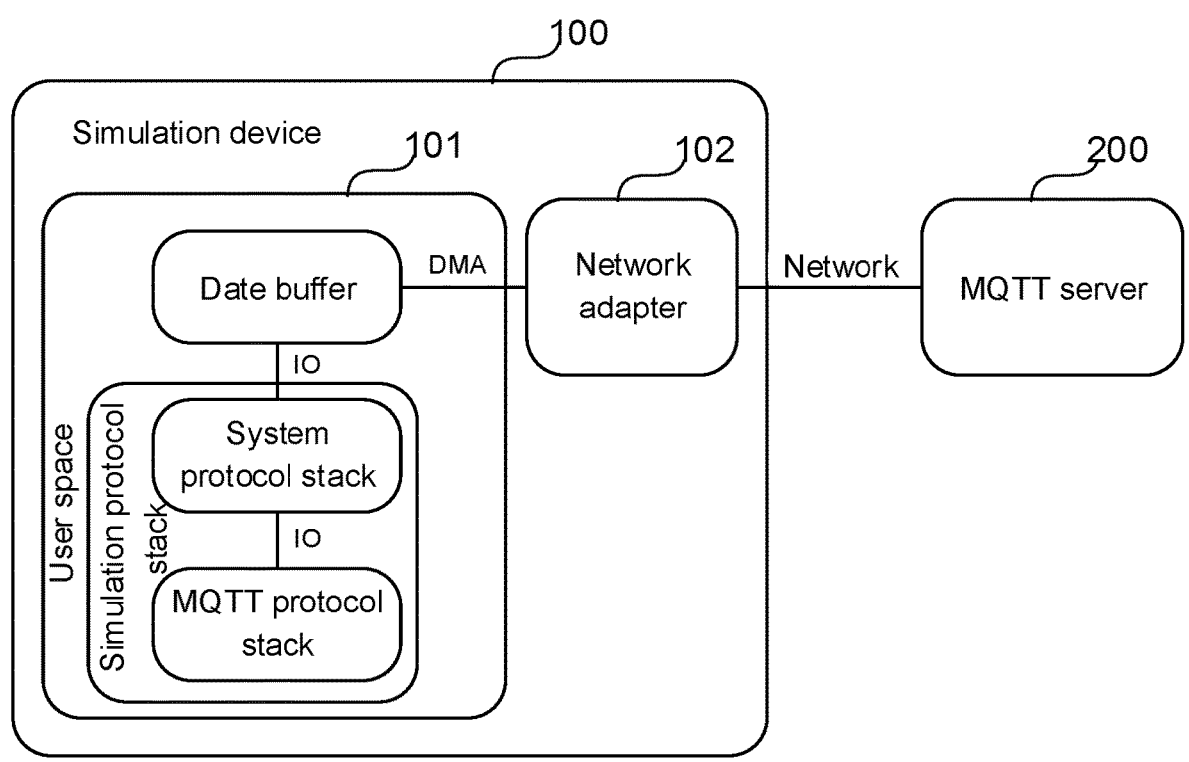
FIG. 1 is a schematic diagram of a system architecture according to an embodiment of the present disclosure.

FIG. 1 is a structure of a system architecture provided by an embodiment of the present disclosure. As shown in FIG.

1, the system architecture may include a simulation device 100 and an MQTT server 200. The simulation device 100 is provided with a user space 101 and a network adapter 102. The simulation device 100 communicates with the MQTT server 200 through the network adapter 102. The network adapter 102 may be a network card device or other communication devices.

As shown in FIG. 1, the user space 101 is provided with a data buffer and a simulation protocol stack. The simulation protocol stack may include a system protocol stack and an MQTT protocol stack. The system protocol stack communicates with the data buffer. The data buffer, the system protocol stack and the MQTT protocol stack are located in a memory of the user space.

A data channel of the network adapter 102 is controlled in the user space 101 by the simulation device. A direct memory access (DMA) input-output (IO) manner is adopted. Hardware directly performs data exchange with a memory block registered in the user space. A highly customized simulation transmission control protocol/Internet protocol (TCP/IP) protocol stack running completely in the user space, the system protocol stack and the MQTT protocol stack share the data buffer, so that data exchange achieves zero copy, there is no CPU context switching, the limitation of a kernel space of an operating system itself on the quantity of TCPs/IPs is broken through, and massive simulation without software restrictions is achieved.

In the traditional simulation test process, simulation data must first be processed by the system protocol stack of the kernel space of the operating system, and converted into data that may be identified by an application layer. Since from the data buffer of the network adapter to a data buffer of the system protocol stack of the kernel space, and then to the data buffer of the user space, data copy operations need to be performed multiple times. This manner is limited by the IO performance bottleneck of the system protocol stack, and cannot achieve large-scale client simulation operations.

Therefore, based on the system architecture provided by the embodiments of the present disclosure, the simulation data sent and received by the network adapter may be in direct communication with the data buffer of the user space, thereby reducing the number of times of copying the simulation data.

Figure 2:
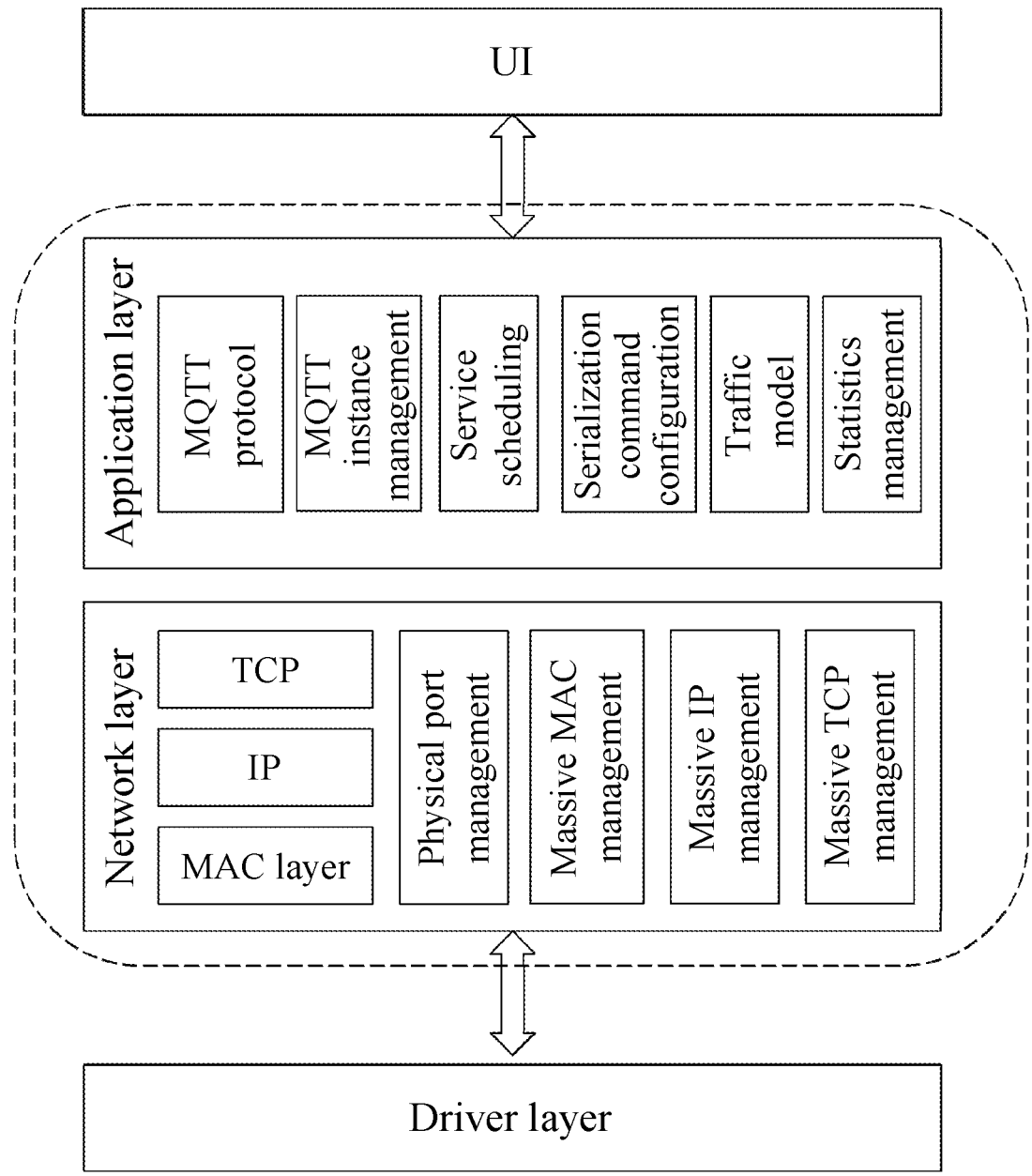
FIG. 2 is a schematic diagram of a client simulation system according to an embodiment of the present disclosure.

In the embodiments of the present disclosure, a client simulation system is also installed on the simulation device. As shown in FIG. 2, the client simulation system includes the application layer and a network layer. The application layer is configured to manage a plurality of MQTT client instances, and control the plurality of MQTT client instances to perform a simulation test on the MQTT server according to a preset traffic model, a preset serialization command, as well as system protocols, physical ports and IPs of the plurality of MQTT client instances managed in the network layer.

The above application layer may include an MQTT protocol simulation module, an MQTT instance management module, a serialization command configuration module, and a traffic model configuration module.

The MQTT protocol simulation module is configured to simulate a simulation behavior initiating the plurality of MQTT client instances, construct MQTT message content corresponding to the simulation behavior, send the MQTT message content to the MQTT server through the network layer, and parse and process an MQTT message reported by the MQTT server through the network layer. For example, behaviors such as initiating connection/subscribing/publishing information/receiving published information/unsubscribing/disconnecting may be simulated. The corresponding MQTT message content is constructed and sent to the network layer, and the MQTT message reported by the network layer is parsed and processed.

The MQTT instance management module is configured to create or delete an MQTT client instance, and maintain a current state and state transition of each MQTT client instance. For example, the MQTT client instances may be created/deleted, and the current state (currently executing a command) and state migration (executing the next serialization command) of a single instance are maintained.

The serialization command configuration module is configured to receive an issued serialization command, and configure a simulation behavior of each MQTT client instance.

The traffic model configuration module is configured to receive an issued traffic model, and configure simulation indexes of each MQTT client instance.

In addition, the application layer is further provided with a service scheduling module and a statistics management module. The service scheduling module may be configured to create a quantity of MQTT client instances corresponding to a preconfigured rate at the preconfigured rate. The statistics management module may be used to save and report statistical data collected by the application layer and the network layer.

As shown in FIG. 2, the client simulation system may be further provided with a User Interface (UI) and a driver layer. The UI is configured to receive the serialization command issued by a user and traffic model configuration, and delivers the serialization command and the traffic model configuration to the application layer. The driver layer is configured to manage drivers used by the plurality of MQTT client instances.

As shown in FIG. 2, the network layer is mainly responsible for the simulation and management of massive TCPs/IPs/MACs, including:
1, a TCP/IP/MAC layer, wherein package sending is to construct content of each layer of the message and send the content to the driver layer, and package receiving is to parse the content of each layer of the message and report the message to the application layer for processing;
2, adding/deleting/managing physical ports currently in use; and
3, adding/deleting/managing currently online TCPs/IPs/MACs.

Based on the structure described above, FIG. 3 exemplarily shows a flow of an MQTT protocol simulation method provided by an embodiment of the present disclosure. The flow may be executed by the above simulation device.

Figure 3:
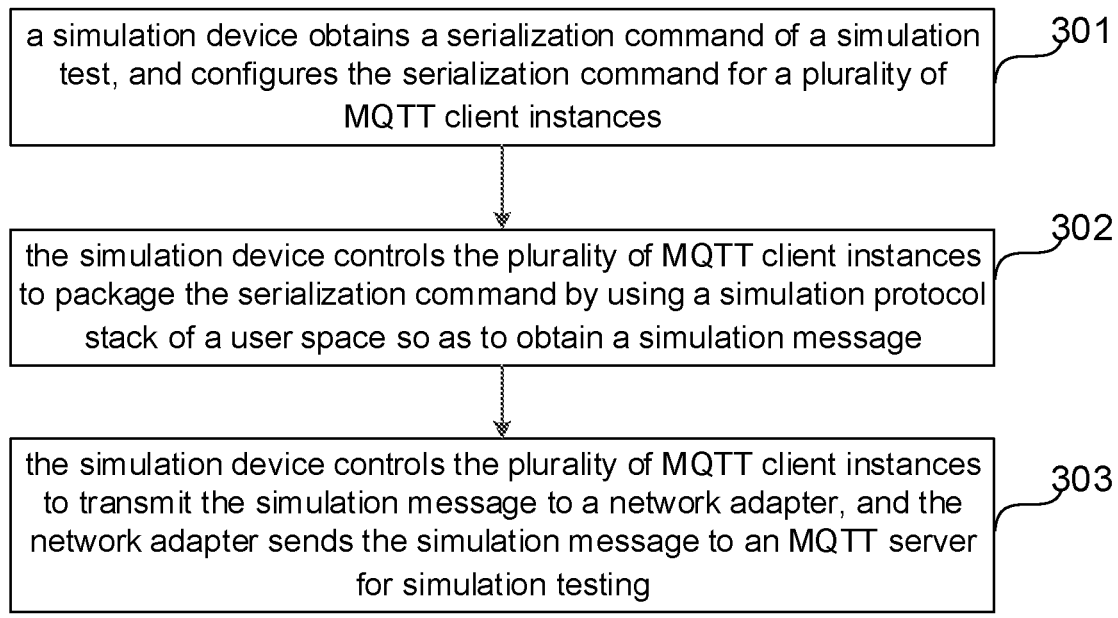
FIG. 3 is a schematic flowchart of an MQTT protocol emulation method according to an embodiment of the present disclosure.

As shown in FIG. 3, the flow specifically includes the following steps.

Step 301, the simulation device obtains a serialization command of a simulation test, and configures the serialization command for a plurality of MQTT client instances.

In the embodiments of the present disclosure, the serialization command may include but is not limited to the following simulation behaviors: a client goes online, the client publishes a topic, the client initiates a subscription, the client stays online, the client cancels the subscription, and the client goes offline.

The MQTT client instances may be divided into simulation publishers and simulation subscribers. When the MQTT client instances are the simulation publishers, the serialization command includes the client going online, the client publishing the topic, the client staying online, and the client going offline. When the MQTT client instances are the simulation subscribers, the serialization command includes the client going online, the client initiating the subscription, the client staying online, the client canceling the subscription, and the client going offline.

After receiving the serialization command, the simulation device may configure the corresponding serialization command for each MQTT client instance through a serialization command configuration module of a client simulation system. For example, when the MQTT client instances are the simulation subscribers, the serialization command such as the client going online, the client initiating the subscription, the client staying online, the client canceling the subscription, and the client going offline may be configured for the simulation subscribers.

In addition, the simulation device may further obtain a simulation traffic model. The simulation traffic model is configured to indicate simulation indexes that may be realized in the simulation test process. The simulation device configures simulation indexes of the simulation test for the plurality of MQTT client instances according to the simulation traffic model. The simulation indexes include a new connection rate and a disconnection rate initiated by the MQTT client instances per unit time, and a quantity of concurrent connections in a simulation cycle. The process of configuring the simulation indexes of the simulation test may be implemented by the above traffic model configuration module.

Step 302, the simulation device controls the plurality of MQTT client instances to package the serialization command by using a simulation protocol stack of a user space so as to obtain a simulation message.

Figure 4:
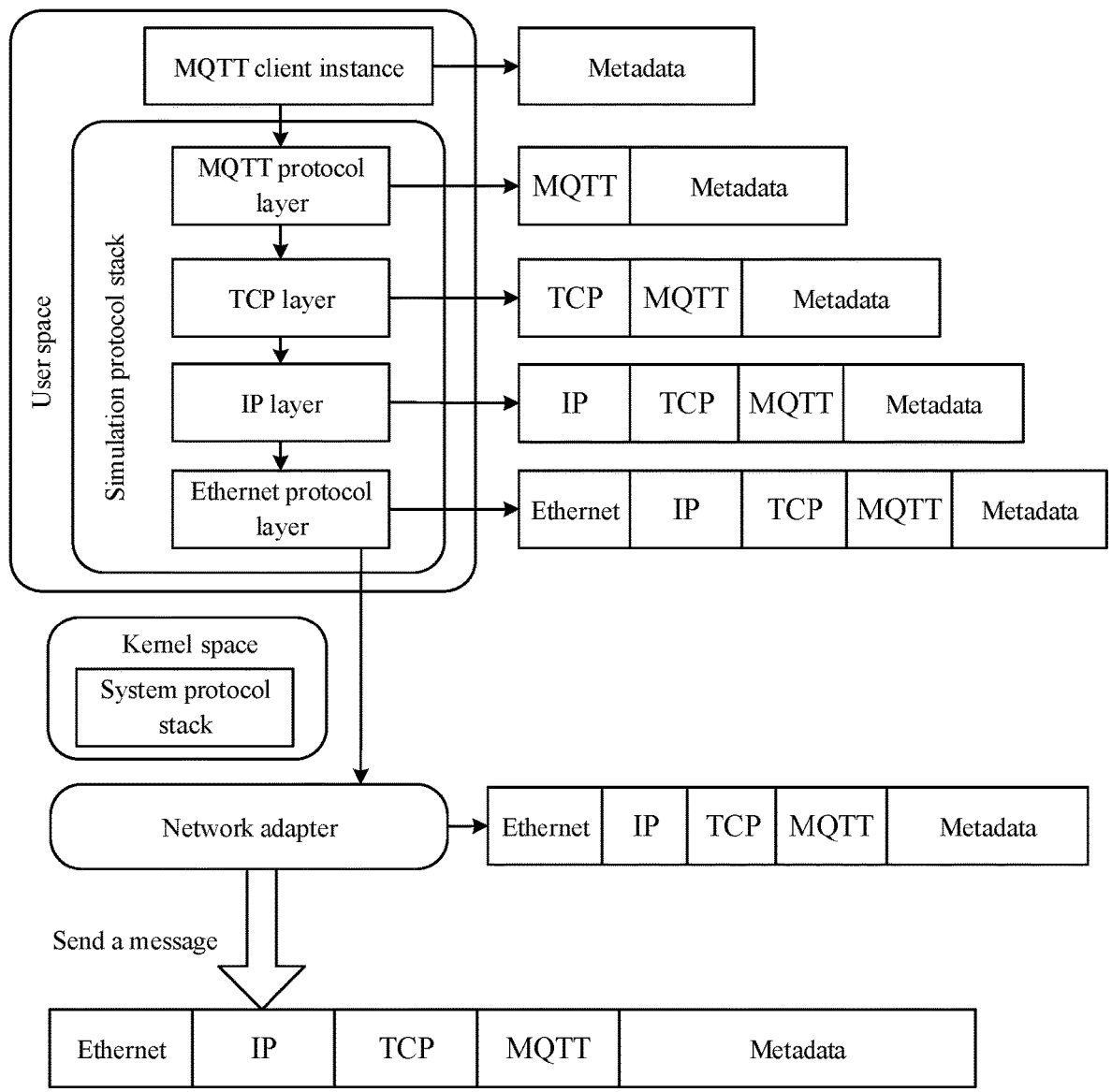
FIG. 4 is a schematic diagram of a packaged message according to an embodiment of the present disclosure.

When the simulation device controls the plurality of MQTT client instances to initiate the simulation test, the serialization command may be packaged by using the simulation protocol stack of the user space to obtain the simulation message. The process of packaging the serialization command may be as shown in FIG. 4. That is, package headers of various simulation protocols are added to the serialization command to form a data packet, namely the simulation message.

Step 303, the simulation device controls the plurality of MQTT client instances to transmit the simulation message to a network adapter, and the network adapter sends the simulation message to an MQTT server for simulation testing.

After the serialization command is packaged through the simulation protocol stack, the simulation message may be sent to the MQTT server through the network adapter for simulation testing. When transmitted to the network adapter, the simulation message may be transmitted to the network adapter through a DMA technology.

In the process of practical application, data transfer of DMA is divided into 3 stages: pre-processing, data transfer and post-processing.

(1) Pre-processing: some necessary preparatory work is completed by a CPU. First, the CPU executes several I/O instructions to test the status of an I/O device, sets initial values to relevant registers of a DMA controller, sets a transfer direction, starts the device, and so on. Then, the CPU continues to execute an original program until the I/O device gets data to be sent (a case of input) or data to be received (a case of output) ready, the I/O device sends a DMA request to the DMA controller, and then the DMA controller sends a bus request (collectively referred to as the DMA request) to the CPU to transfer data. (2) Data transfer: data transfer of the DMA may be based on a single byte (or word), and for data block transfer (such as a hard disk), data input and output operations after the DMA occupies a bus are achieved through a cycle. What needs to be specially noted is that this cycle is also achieved by the DMA controller (rather than executing the program by the CPU), that is, the data transfer phase is completely controlled by the DMA (hardware). (3) Post-processing: the DMA controller sends an interrupt request to the CPU, and the CPU executes an interrupt service program for DMA end processing, including checking whether data sent to a main memory are correct, whether there is an error in the transfer process of testing (if there is an error, shift to a diagnostic program), deciding whether to continue to use the DMA to transfer other data blocks, etc.

By transmitting the message through the DMA technology, the time for data transmission from the network adapter to the user space can be saved, and the performance of the simulation test can be improved.

In addition, the embodiments of the present disclosure further provide a process of receiving a MQTT message sent by the MQTT server. The process includes: the simulation device controls the network adapter to receive the MQTT message sent by the MQTT server. The MQTT message includes MQTT client Instance IDs. Then, the simulation device controls the network adapter to transmit the MQTT message to MQTT client instances corresponding to the MQTT client instance IDs according to the MQTT client instance IDs. Finally, the simulation device controls the MQTT client instances corresponding to the MQTT client instance IDs to parse the MQTT message by using the simulation protocol stack of the user space so as to obtain test response data.

Figure 5:
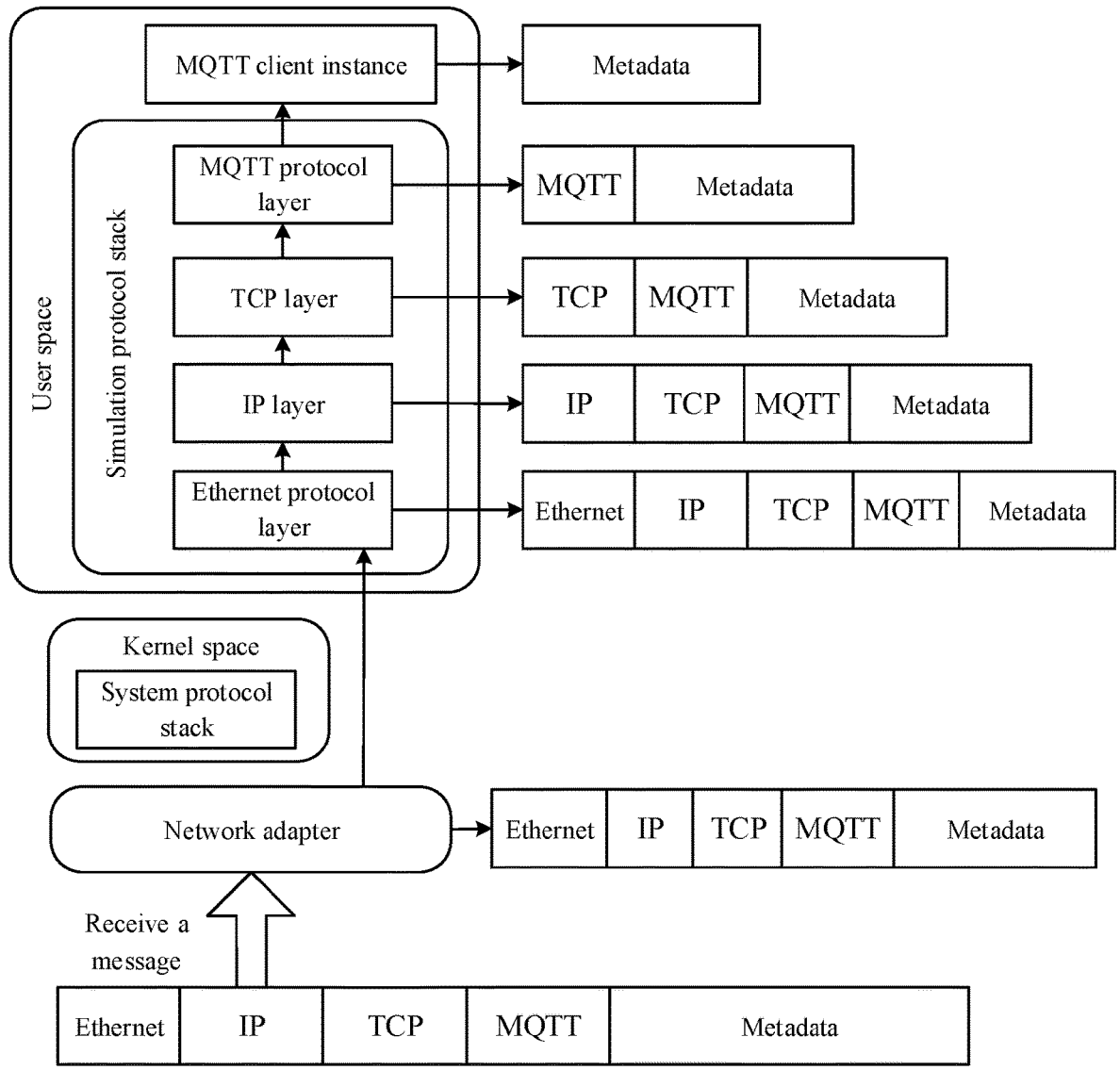
FIG. 5 is a schematic diagram of a parsed message according to an embodiment of the present disclosure.

The direction of the message may be as shown in FIG. 5. After being received, the message may be parsed by each protocol layer of the simulation protocol stack in the user space successively, the packet header of the message is removed, and finally the test response data are obtained.

It should be noted that, in the process of transmitting the MQTT message to the MQTT client instances corresponding to the MQTT client instance IDs, the MQTT message may also be directly transmitted to the MQTT client instances corresponding to the MQTT client instance IDs by using the DMA technology, thereby shortening the time for data transfer.

It should be noted that, in the above process of transmitting the message, each MQTT client instance may communicate with the MQTT server based on an independent IP.

In order to better explain the MQTT protocol simulation method in the embodiments of the present disclosure, the following will make a description through an implementation scenario.

Figure 6:
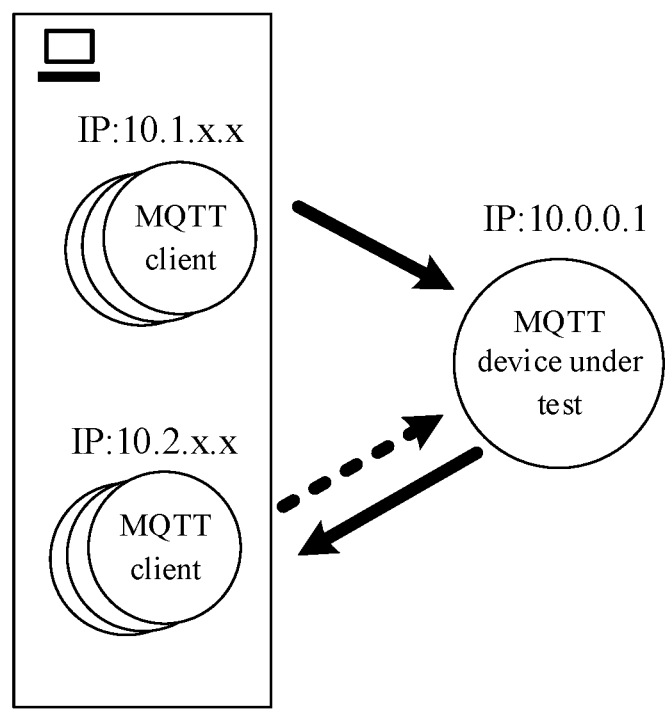
FIG. 6 is a schematic diagram of a networking topology according to an embodiment of the present disclosure.

During the simulation test, the networking topology shown in FIG. 6 can be used. In the networking topology, on a test device, an MQTT client instance Publisher (a simulation publisher) is configured to a physical port with an IP network segment being 10.1.X.X; and an MQTT client instance Subscriber (a simulation subscriber) is configured to another physical port with an IP network segment being 10.2.X.X. The both ports are connected to a network where a device under test (Broker) is located.

In the embodiments of the present disclosure, a tester can configure a test scenario, primarily the configuration of the serialization command and the traffic model, through the UI. The serialization command includes but is not limited to the following simulation behaviors: a client goes online, the client publishes a topic, the client initiates a subscription, the client stays online, the client cancels the subscription, and the client goes offline.

In the implementation process, when the MQTT client instances are the simulation publishers, the serialization command includes the client going online, the client publishing the topic, the client staying online, and the client going offline; and when the MQTT client instances are the simulation subscribers, the serialization command includes the client going online, the client initiating the subscription, the client staying online, the client canceling the subscription, and the client going offline.

According to the networking topology as shown in FIG. 6, the behaviors of the Publishers and the Subscribers may be configured separately. For the Publishers, their serialization behaviors may be defined as: going online→publishing Topic and information regularly→staying online for a specified time→going offline. For the Subscribers, their serialization behaviors may be defined as: going online→subscribing Topic→staying online (listening and receiving information published by Topic) for a specified time→cancelling the subscription of Topic→going offline.

For the configuration of the traffic model, based on the networking topology shown in FIG. 6, the traffic model may be configured as: a client connection is initiated at an initial rate of 5,000 per second, the client connection is disconnected at an initial rate of 1,000 per second, the initiation rate is increased by 5,000 per second for 10 seconds, and the disconnection rate is increased by 1,000 per second for 10 seconds, simulating an overall traffic rising period. The initiation and disconnection rates obtained after the 10 seconds are kept unchanged, that is, the initiation rate of 50,000 per second and the disconnection rate of 10,000 per second are kept for 10 seconds, simulating an overall traffic peak period. The initiation rate of 50,000 per second and the disconnection rate of 0 are kept for 10 seconds, simulating an online traffic peak period, the quantity of concurrent connections reaches 1.12 million. The initiation rate and the disconnection rate are kept to be 0 for 10 seconds, simulating an overall concurrent traffic stable period. All connections are disconnected at a uniform rate, that is, 56,000 per second, for 20 seconds, simulating an offline traffic peak period.

It should be noted that any MQTT client instance in the plurality of MQTT client instances performs the simulation test on the MQTT server based on an independent IP.

Figure 7:
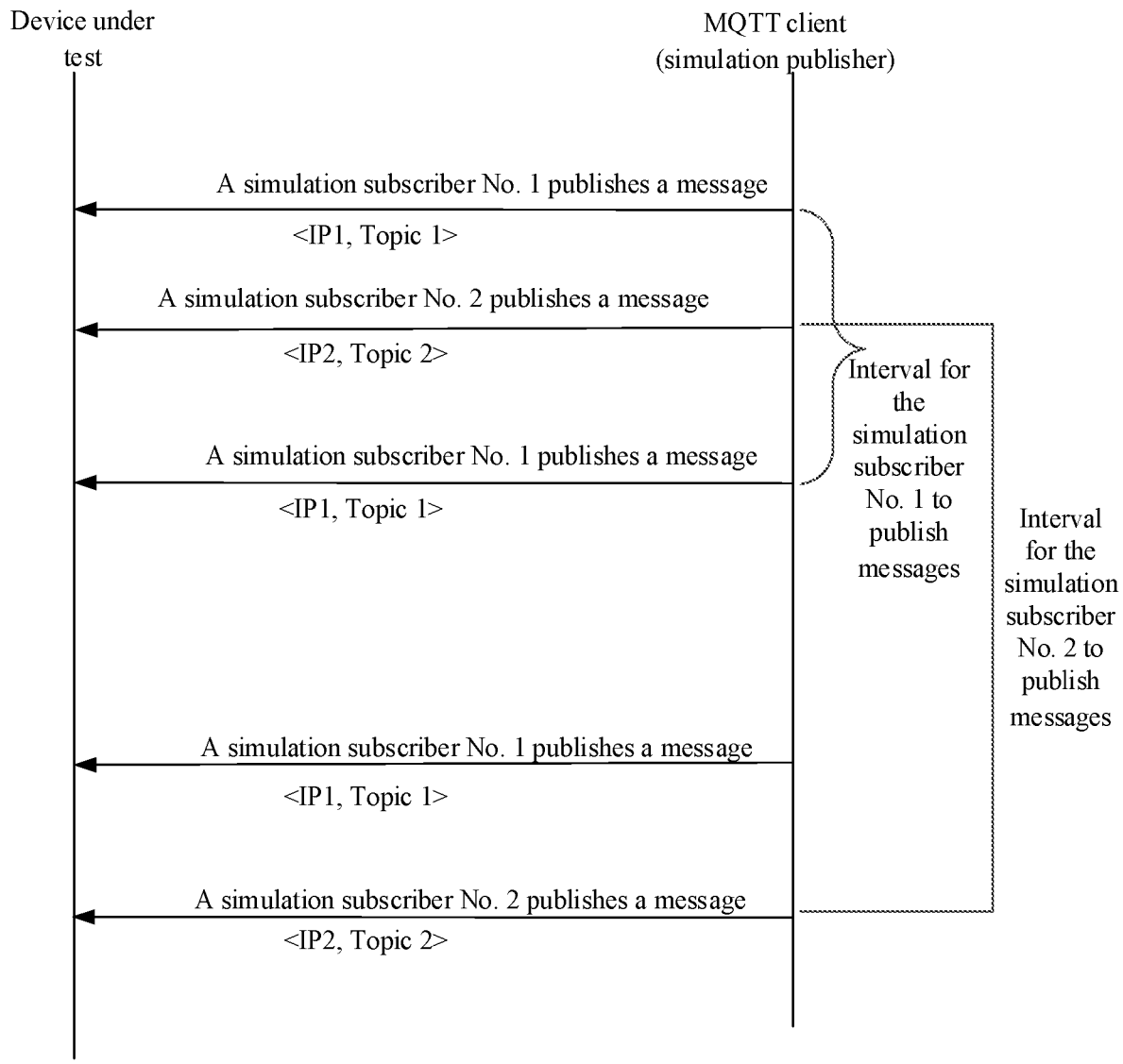
FIG. 7 is a schematic diagram of Publisher simulation according to an embodiment of the present disclosure.

During the simulation test, the test device starts the MQTT simulation service according to a test model configured by the tester. Each virtual Publisher (simulation publisher) uses an independent IP, and periodically sends messages of a specified Topic to the Broker (the device under test) according to the configuration in the running process. The process may be shown in FIG. 7. Each message of the specified Topic needs to be packaged and processed through the simulation protocol stack of the user space.

Figure 8:
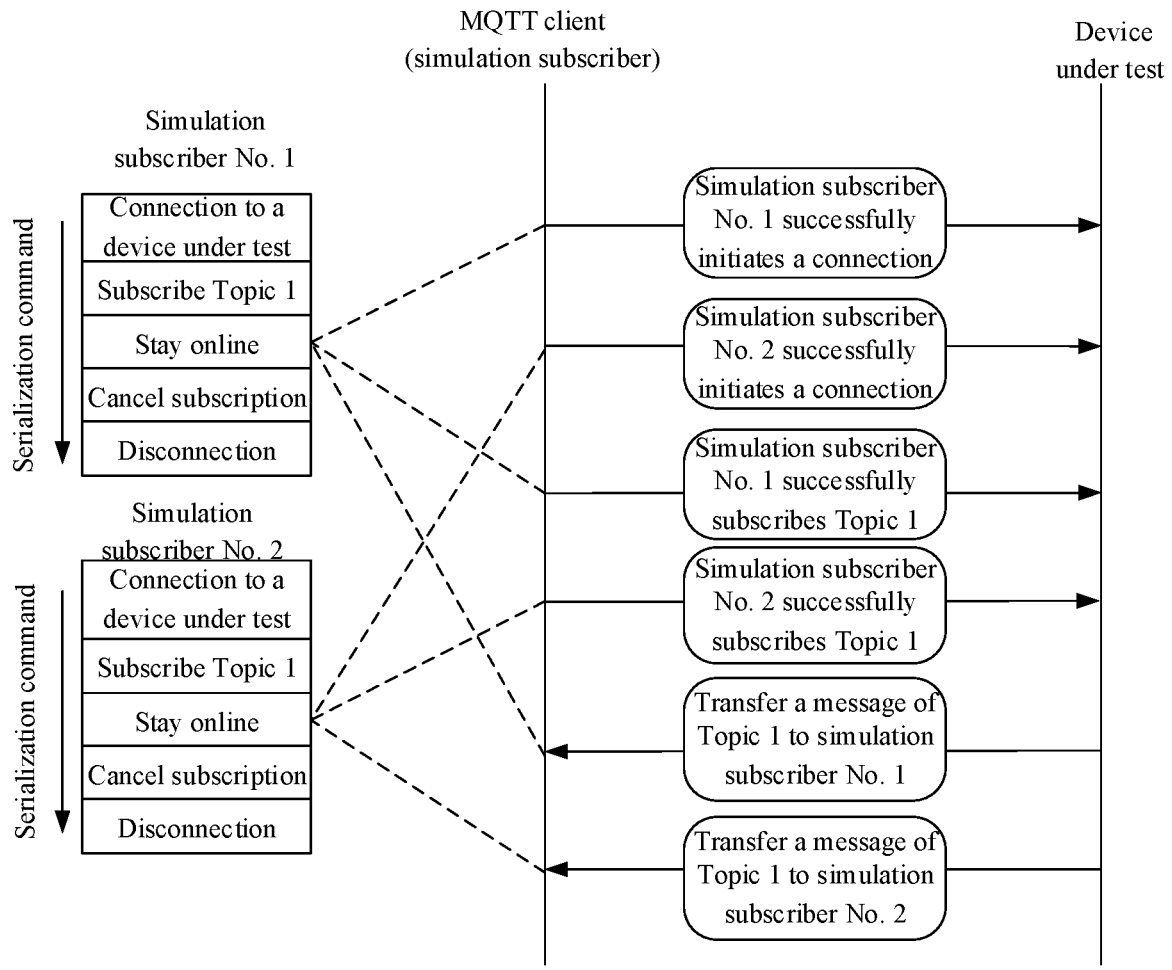
FIG. 8 is a schematic diagram of Subscriber simulation according to an embodiment of the present disclosure.

Each virtual Subscriber (simulation subscriber) also uses an independent IP. A system generates corresponding client instances in the running process. The serialization commands are read independently in parallel, and executed one by one. The process may be as shown in FIG. 8. Each serialization command needs to be packaged by the simulation protocol stack of the user space before it may be sent.

So far, the entire massive IoT client simulation system is completed, and a full envelopment test to the MQTT server can be realized. Using this solution, massive IoT clients can be simulated on the test device (the upper limit of the quantity of simulations depends on the memory capacity of the test device), and the behavior of each client (Publisher/Subscriber) can be defined according to the needs of a test scenario, so as to initiate traffic close to a real network to test the performance and reliability of the IoT server.

It should be noted that, when configuring massive IP simulation, an IP may be either IPv4 or IPv6, and the form of an IP address has no effect on the overall technical solution.

When defined, the MQTT client serialization command may be abstracted as that an MQTT simulation command has but is not limited to the following commands:
the client goes online (connected), the client publishes a topic, the client initiates a subscription, the client stays online,
the client cancels the subscription, and the client goes offline (disconnected).

Client instances which are purely Publishers, purely Subscribers, and both Publishers and Subscribers may be defined through a unified command set.

In the embodiments of the present disclosure, the data buffer, the system protocol stack and the MQTT protocol stack are simultaneously arranged in the user space so that the system protocol stack and the MQTT protocol stack can be directly copied when performing data interaction, so even if a large quantity of MQTT client instances are added, high-efficiency simulation testing can be achieved, thereby improving testing efficiency.

The embodiments of the present disclosure show that the simulation device obtains the serialization command of the simulation test and configures the serialization command for the plurality of MQTT client instances, controls the plurality of MQTT client instances to package the serialization command by using the simulation protocol stack of the user space so as to obtain the simulation message, transmits the simulation message to the network adapter, and the network adapter sends the message to the MQTT server for simulation testing. When the simulation device performs simulation testing, since the serialization command can be packaged directly by means of the simulation protocol stack in the user space so as to obtain the simulation message, the serialization command does not need to be packaged by means of the system protocol stack in the kernel space, which can improve the efficiency of simulation testing. Further, the quantity of the MQTT client instances is not limited by the kernel space, and the simulation testing of a large number of MQTT client instances can be achieved.

Figure 9:
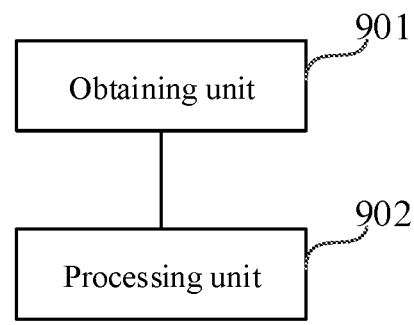
FIG. 9 is a schematic structural diagram of a simulation device according to an embodiment of the present disclosure.

Based on the same technical concept, FIG. 9 exemplarily shows a simulation device provided by an embodiment of the present disclosure. The simulation device is provided with a user space and a network adapter. The simulation device may execute an MQTT protocol simulation method.

As shown in FIG. 9, the simulation device includes:
an obtaining unit 901, configured to obtain a serialization command of a simulation test, and configure the serialization command for a plurality of MQTT client instances; and
a processing unit 902, configured to control the plurality of MQTT client instances to package the serialization command by using a simulation protocol stack of a user space so as to obtain a simulation message; and control the plurality of MQTT client instances to transmit the simulation message to the network adapter.

The network adapter sends the simulation message to an MQTT server for simulation testing.

Optionally, the processing unit 902 is further configured to:
control the network adapter to receive an MQTT message sent by the MQTT server, the MQTT message including MQTT client instance ID(s);

control the network adapter to transmit the MQTT message to MQTT client instance(s) corresponding to the MQTT client instance ID(s) according to the MQTT client instance ID(s); and control the MQTT client instance(s) corresponding to the MQTT client instance ID(s) to parse the MQTT message by using the simulation protocol stack of the user space so as to obtain test response data.

Optionally, the processing unit 902 is configured to:

control the plurality of MQTT client instances to transmit the simulation message to the network adapter by using a direct memory access (DMA) technology; and control the network adapter to transmit the MQTT message to the MQTT client instance(s) corresponding to the MQTT client instance ID(s) by using the DMA technology according to the MQTT client instance ID(s).

Optionally, the processing unit 902 is further configured to:

control the obtaining unit 901 to obtain a simulation traffic model.

configure simulation indexes of the simulation test for the plurality of MQTT client instances according to the simulation traffic model.

The simulation indexes include a new connection rate and a disconnection rate initiated by the MQTT client instances per unit time, and a quantity of concurrent connections in a simulation cycle.

Optionally, the serialization command includes but is not limited to the following simulation behaviors:

a client goes online, the client publishes a topic, the client initiates a subscription, the client stays online, the client cancels the subscription, and the client goes offline.

Optionally, any MQTT client instance in the plurality of MQTT client instances includes a simulation publisher and a simulation subscriber.

When the MQTT client instances are simulation publishers, the serialization command includes the client going online, the client publishing the topic, the client staying online, and the client going offline.

When the MQTT client instances are simulation subscribers, the serialization command includes the client going online, the client initiating the subscription, the client staying online, the client canceling the subscription, and the client going offline.

Based on the same technical concept, embodiments of the present disclosure provide a simulation device, including at least one processor; and a memory in communication connection to the at least one processor. The memory stores instructions executable by the at least one processor, and the instructions are executed by the at least one processor to enable the at least one processor to execute the simulation method in the above embodiments.

Figure 10:
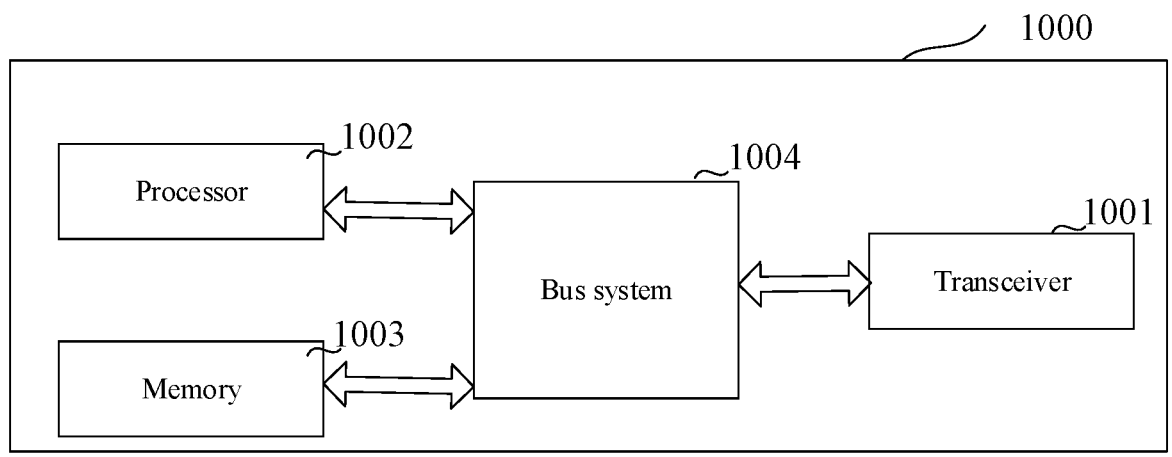
FIG. 10 is a schematic structural diagram of a simulation device according to an embodiment of the present disclosure.

Taking one processor as an example, FIG. 10 is a structure of the simulation device provided by an embodiment of the present disclosure. The simulation device 1000 includes: a transceiver 1001, a processor 1002, a memory 1003 and a bus system 1004.

The memory 1003 is configured to store programs. The programs may include program codes, and the program codes include computer operation instructions. The memory 1003 may be a random access memory (RAM), or may be a non-volatile memory, such as at least one disk memory. Only one memory is shown in the figure, and of course, there may also be a plurality of memories as required. The memory 1003 may also be a memory in the processor 1002.

The memory 1003 stores the following elements, executable modules or data structures, or a subset thereof, or an extended set thereof:

operation instructions: including various operation instructions for implementing various operations;

an operating system: including various system programs for implementing various basic services and processing hardware-based tasks.

The above simulation method in the embodiments of the present disclosure may be applied to the processor 1002, or implemented by the processor 1002. The processor 1002 may be an integrated circuit chip with signal processing capability. In the implementation process, each step of the above simulation method may be completed by an integrated logic circuit of hardware in the processor 1002 or an instruction in the form of software. The above processor 1002 may be a general purpose processor, a digital signal processor (DSP), an application specific integrated circuit (ASIC), a field programmable gate array (FPGA) or other programmable logic devices, discrete gate or transistor logic devices, and discrete hardware components. The method, steps, and logic block diagrams disclosed in the embodiments of the present application may be implemented or executed. The general purpose processor may be a microprocessor or the processor may be any conventional processor or the like. The steps of the method disclosed in the embodiments of the present disclosure may be directly embodied as executed by a hardware decoding processor, or executed by a combination of hardware and software modules in the decoding processor. The software modules may be located in mature storage media in the art, such as a random access memory, a flash memory, a read-only memory, a programmable read-only memory or an electrically erasable programmable memory, and a register. The storage media are located in the memory 1003. The processor 1002 reads information in the memory 1003, and executes the following steps in combination with its hardware.

The transceiver 1001 is configured to obtain a serialization command of a simulation test, and configure the serialization command for a plurality of MQTT client instances.

The processor 1002 is configured to control the plurality of MQTT client instances to package the serialization command by using a simulation protocol stack of a user space so as to obtain a simulation message; and control the plurality of MQTT client instances to transmit the simulation message to a network adapter. The network adapter sends the simulation message to an MQTT server for simulation testing.

Optionally, the processor 1002 is further configured to:

control the network adapter to receive an MQTT message sent by the MQTT server, the MQTT message including MQTT client instance IDs;

control the network adapter to transmit the MQTT message to MQTT client instances corresponding to the MQTT client instance IDs according to the MQTT client instance IDs; and control the MQTT client instances corresponding to the MQTT client instance IDs to parse the MQTT message by using the simulation protocol stack of the user space so as to obtain test response data.

Optionally, the processor 1002 is configured to:

control the plurality of MQTT client instances to transmit the simulation message to the network adapter by using a DMA technology; and control the network adapter to transmit the MQTT message to the MQTT client instances corresponding to the MQTT client instance IDs by using the DMA technology according to the MQTT client instance IDs.

Optionally, the processor 1002 is further configured to:

control the transceiver 1001 to obtain a simulation traffic model; and configure simulation indexes of the simulation test for the plurality of MQTT client instances according to the simulation traffic model.

The simulation indexes include a new connection rate and a disconnection rate initiated by the MQTT client instances per unit time, and a quantity of concurrent connections in a simulation cycle.

Optionally, the serialization command includes but is not limited to the following simulation behaviors:

a client goes online, the client publishes a topic, the client initiates a subscription, the client stays online, the client cancels the subscription, and the client goes offline.

Optionally, any MQTT client instance in the plurality of MQTT client instances includes a simulation publisher and a simulation subscriber.

When the MQTT client instances are simulation publishers, the serialization command includes the client going online, the client publishing the topic, the client staying online, and the client going offline.

When the MQTT client instances are simulation subscribers, the serialization command includes the client going online, the client initiating the subscription, the client staying online, the client canceling the subscription, and the client going offline.

Those skilled in the art can understand that related hardware may be indicated by programs to complete all or part of the steps in the method of the above embodiments. The programs are stored in the storage medium, including several instructions to enable a device (which may be a single-chip microcomputer, a chip, etc.) or a processor to execute all or part of the steps of the method of the embodiments of the present application. The aforementioned storage media include: a U disk, a mobile hard disk, a read-only memory (ROM), a random access memory (RAM), a magnetic disk, a compact disc and other media that can store program codes.

Based on the same technical concept, embodiments of the present disclosure provide a computing device, including:

a memory, configured to store program instructions; and a processor, configured to call the program instructions stored in the memory, and execute the above MQTT protocol simulation method according to an obtained program.

Based on the same technical concept, embodiments of the present disclosure provide a computer-readable non-volatile storage medium, including computer-readable instructions that, when read and executed by a computer, enable the computer to execute the above MQTT protocol simulation method.

Although preferred embodiments of the present disclosure have been described, those skilled in the art, once armed with the basic inventive concepts, can make additional alterations and modifications to these embodiments. Therefore, it is intended that the appended claims be interpreted as including the preferred embodiments and all alterations and modifications that fall within the scope of the present disclosure.

It will be apparent to those skilled in the art that various modifications and variations can be made in the present disclosure without departing from the spirit or scope of the present disclosure. Thus, it is intended that the present disclosure cover these modifications and variations of the present disclosure provided they come within the scope of the appended claims of the present application and their equivalents.

What is claimed is:

1. A message queuing telemetry transport (MQTT) protocol simulation method, wherein a simulation device is provided with a user space and a network adapter; and the method comprises:

obtaining, by the simulation device, a serialization command of a simulation test, and configuring, by the simulation device, the serialization command for a plurality of MQTT client instances;

controlling, by the simulation device, the plurality of MQTT client instances to package the serialization command by using a simulation protocol stack of the user space so as to obtain a simulation message;

controlling, by the simulation device, the plurality of MQTT client instances to transmit the simulation message to the network adapter by using a direct memory access (DMA) technology, and sending, by the network adapter, the simulation message to an MQTT server for simulation testing;

controlling, by the simulation device, the network adapter to receive an MQTT message sent by the MQTT server, wherein the MQTT message comprises an MQTT client instance ID;

controlling, by the simulation device, the network adapter to transmit the MQTT message to an MQTT client instance corresponding to the MQTT client instance ID by using the DMA technology according to the MQTT client instance ID; and controlling, by the simulation device, the MQTT client instance corresponding to the MQTT client instance ID to parse the MQTT message by using the simulation protocol stack of the user space so as to obtain test response data.

2. The method according to claim 1, further comprising:

obtaining, by the simulation device, a simulation traffic model; and configuring, by the simulation device, simulation indexes of the simulation test for the plurality of MQTT client instances according to the simulation traffic model;

wherein the simulation indexes comprise a new connection rate and a disconnection rate initiated by the plurality of MQTT client instances per unit time, and a quantity of concurrent connections in a simulation cycle.

3. The method according to claim 1, wherein the serialization command comprises but is not limited to following simulation behaviors:

a client goes online, the client publishes a topic, the client initiates a subscription, the client stays online, the client cancels the subscription, and the client goes offline.

4. The method according to claim 3, wherein any MQTT client instance in the plurality of MQTT client instances comprises a simulation publisher and a simulation subscriber;

when the plurality of MQTT client instances are the simulation publisher, the serialization command comprises the client going online, the client publishing the topic, the client staying online, and the client going offline; and when the plurality of MQTT client instances are the simulation subscriber, the serialization command comprises the client going online, the client initiating the subscription, the client staying online, the client canceling the subscription, and the client going offline.

5. A computing device, comprising:
a memory, configured to store program instructions; and
a processor, configured to call the program instructions stored in the memory, and execute the method according to claim 1 according to the program instructions.

6. A computer-readable non-transitory storage medium, comprising computer-readable instructions that, when read and executed by a computer, enable the computer to execute the method according to claim 1.

7. A simulation device, comprising:
at least one processor; and
a memory in communication connection to the at least one processor, wherein
the memory stores instructions executable by the at least one processor, and the instructions are executed by the at least one processor to enable the at least one processor to execute the method according to claim 1.

8. The method according to claim 1, wherein:
the simulation protocol stack comprises a system protocol stack and an MQTT protocol stack;
the system protocol stack and the MQTT protocol stack share a data buffer in the user space; and
the system protocol stack communicates with the data buffer.

9. A message queuing telemetry transport (MQTT) protocol simulation method, wherein a simulation device is provided with a user space and a network adapter; and the method comprises:
obtaining, by the simulation device, a serialization command of a simulation test, and configuring, by the simulation device, the serialization command for a plurality of MQTT client instances;
controlling, by the simulation device, the plurality of MQTT client instances to package the serialization command by using a simulation protocol stack of the user space so as to obtain a simulation message;
controlling, by the simulation device, the plurality of MQTT client instances to transmit the simulation message to the network adapter by using a direct memory access (DMA) technology, and sending, by the network adapter, the simulation message to an MQTT server for simulation testing;
obtaining, by the simulation device, a simulation traffic model; and
configuring, by the simulation device, simulation indexes of the simulation test for the plurality of MQTT client instances according to the simulation traffic model;
wherein the simulation indexes comprise a new connection rate and a disconnection rate initiated by the plurality of MQTT client instances per unit time, and a quantity of concurrent connections in a simulation cycle.

10. The method according to claim 9, wherein the serialization command comprises but is not limited to following simulation behaviors:
a client goes online, the client publishes a topic, the client initiates a subscription, the client stays online, the client cancels the subscription, and the client goes offline.

11. The method according to claim 10, wherein any MQTT client instance in the plurality of MQTT client instances comprises a simulation publisher and a simulation subscriber;
when the plurality of MQTT client instances are the simulation publisher, the serialization command comprises the client going online, the client publishing the topic, the client staying online, and the client going offline; and
when the plurality of MQTT client instances are the simulation subscriber, the serialization command comprises the client going online, the client initiating the subscription, the client staying online, the client canceling the subscription, and the client going offline.

12. The method according to claim 9, wherein:
the simulation protocol stack comprises a system protocol stack and an MQTT protocol stack;
the system protocol stack and the MQTT protocol stack share a data buffer in the user space; and
the system protocol stack communicates with the data buffer.

13. A computing device, comprising:
a memory, configured to store program instructions; and
a processor, configured to call the program instructions stored in the memory, and execute the method according to claim 9 according to the program instructions.

14. A computer-readable non-transitory storage medium, comprising computer-readable instructions that, when read and executed by a computer, enable the computer to execute the method according to claim 9.

15. A simulation device, comprising:
at least one processor; and
a memory in communication connection to the at least one processor, wherein
the memory stores instructions executable by the at least one processor, and the instructions are executed by the at least one processor to enable the at least one processor to execute the method according to claim 9.

16. A message queuing telemetry transport (MQTT) protocol simulation method, wherein a simulation device is provided with a user space and a network adapter; and the method comprises:
obtaining, by the simulation device, a serialization command of a simulation test, and configuring, by the simulation device, the serialization command for a plurality of MQTT client instances;
controlling, by the simulation device, the plurality of MQTT client instances to package the serialization command by using a simulation protocol stack of the user space so as to obtain a simulation message; and
controlling, by the simulation device, the plurality of MQTT client instances to transmit the simulation message to the network adapter by using a direct memory access (DMA) technology, and sending, by the network adapter, the simulation message to an MQTT server for simulation testing;
wherein the serialization command comprises but is not limited to following simulation behaviors:
a client goes online, the client publishes a topic, the client initiates a subscription, the client stays online, the client cancels the subscription, and the client goes offline;
wherein any MQTT client instance in the plurality of MQTT client instances comprises a simulation publisher and a simulation subscriber;
when the plurality of MQTT client instances are the simulation publisher, the serialization command comprises the client going online, the client publishing the topic, the client staying online, and the client going offline; and
when the plurality of MQTT client instances are the simulation subscriber, the serialization command comprises the client going online, the client initiating the subscription, the client staying online, the client canceling the subscription, and the client going offline.

17. The method according to claim 16, wherein:
the simulation protocol stack comprises a system protocol stack and an MQTT protocol stack;
the system protocol stack and the MQTT protocol stack share a data buffer in the user space; and
the system protocol stack communicates with the data buffer.

18. A computing device, comprising:
a memory, configured to store program instructions; and
a processor, configured to call the program instructions stored in the memory, and execute the method according to claim 16 according to the program instructions.

19. A computer-readable non-transitory storage medium, comprising computer-readable instructions that, when read and executed by a computer, enable the computer to execute the method according to claim 16.

20. A simulation device, comprising:
at least one processor; and
a memory in communication connection to the at least one processor, wherein
the memory stores instructions executable by the at least one processor, and the instructions are executed by the at least one processor to enable the at least one processor to execute the method according to claim 16.

* * * * *